United States Patent
Patterson et al.

(10) Patent No.: US 8,750,825 B2
(45) Date of Patent: Jun. 10, 2014

(54) METHODS, SYSTEMS, AND COMPUTER READABLE MEDIA FOR INTER-CARRIER ROAMING COST CONTAINMENT

(75) Inventors: Taren J. Patterson, Richardson, TX (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 32 days.

(21) Appl. No.: 13/244,253

(22) Filed: Sep. 23, 2011

(65) Prior Publication Data

US 2012/0129488 A1 May 24, 2012

Related U.S. Application Data

(60) Provisional application No. 61/386,477, filed on Sep. 25, 2010.

(51) Int. Cl.
*H04W 4/24* (2009.01)

(52) U.S. Cl.
USPC ...................................... 455/406; 455/456.1

(58) Field of Classification Search
USPC ................. 455/403, 406, 432.1, 432.3, 456.1
See application file for complete search history.

(56) References Cited

U.S. PATENT DOCUMENTS

| | | | |
|---|---|---|---|
| 7,260,406 B2* | 8/2007 | Lee et al. | 455/456.1 |
| 7,292,592 B2* | 11/2007 | Rune | 370/401 |
| 2009/0264096 A1* | 10/2009 | Cai et al. | 455/406 |
| 2009/0268635 A1* | 10/2009 | Gallagher et al. | 370/254 |
| 2011/0161504 A1* | 6/2011 | Zhou et al. | 709/227 |
| 2012/0002541 A1* | 1/2012 | Lee et al. | 370/230 |

OTHER PUBLICATIONS

"Universal Mobile Telecommunications System (UMTS); LTE; Policy and charging control over Gx reference point (3GPP TS 29.212 version 9.2.0 Release 9)," ETSI TS 129 212, V9.2.0 (Apr. 2010).

Korhonen et al., "Clarifications on the Routing of Diameter Requests Based on the Username and the Realm," RFC 5729, pp. 1-12 (Dec. 2009).

Korhonen et al., "Diameter User-Name and Realm Based Request Routing Clarifications," draft-ietf-dime-nai-routing-04.txt, pp. 1-13 (Oct. 6, 2009).

* cited by examiner

*Primary Examiner* — Cong Tran
(74) *Attorney, Agent, or Firm* — Jenkins, Wilson, Taylor & Hunt, P.A.

(57) ABSTRACT

Methods, systems, and computer readable media for enabling location-based policy in a mobile communication network are disclosed. According to one method, a first Diameter signaling message is received at a Diameter agent. Subscriber identification information and roaming information are extracted from the first Diameter message and the extracted information is communicated to a policy control function.

19 Claims, 6 Drawing Sheets

FIG. 6

METHODS, SYSTEMS, AND COMPUTER READABLE MEDIA FOR INTER-CARRIER ROAMING COST CONTAINMENT

PRIORITY CLAIM

This application claims the benefit of U.S. Provisional Patent Application Ser. No. 61/386,477 filed Sep. 25, 2010; the disclosure of which is incorporated herein by reference in its entirety.

TECHNICAL FIELD

The subject matter described herein relates to inter-carrier roaming. More specifically, the subject matter relates to methods, systems, and computer readable media for providing inter-carrier roaming cost containment.

BACKGROUND

A policy and charging rules function (PCRF), or policy engine, at its most basic level, is a server that deploys a set of operator-created business rules in a communications network. These rules can be used to define how broadband network resources should be allocated to subscribers and applications and under what conditions. The PCRF is a policy decision point that may be centrally located in the network and communicates with access edge devices (e.g., policy enforcement points), applications, and operational support systems/business support systems (OSS/BSS) platforms to manage subscriber and network information according to the established rules. Policy rules encompass the business and technological rules that govern which network services a subscriber can access, at what bandwidth level, when, and for how long. Generally speaking, the PCRF queries, coordinates, and adjusts all of the network resources needed to provide the required services to individual, authorized subscribers. As such, the PCRF operates solely in the control plane and does not operate in the data plane. More specifically, the PCRF identifies appropriate policy rules for a subscriber by querying a subscription profile repository (SPR) and enforces the rules by sending the rules to, for example, a policy and charging enforcement function (PCEF).

Currently, via the S9 interface, a home PCRF assigns the same policy to one of its subscribers whether the subscriber is roaming in-network or out-of network. Additionally, there is currently no mechanism defined to integrate roaming agreement intelligence (e.g., data roaming cost) with policy decisions. International roaming costs lack this level of control.

However, it may be desirable for an operator to selectively apply a first policy to the subscriber when the subscriber is roaming in-network and to apply a second policy to that same subscriber when the subscriber is roaming out-of-network. One reason that enabling location-based policy in a mobile communication network may be desirable is in order to provide inter-carrier roaming cost containment to network operators.

Accordingly, in light of these difficulties, a need exists for improved methods, systems, and computer readable media for providing inter-carrier roaming cost containment.

SUMMARY

Methods, systems, and computer readable media for enabling location-based policy in a mobile communication network are disclosed. According to one method, a first Diameter signaling message is received at a Diameter agent. Subscriber identification and roaming information are extracted from the first Diameter message and the extracted information is communicated to a policy control function.

The roaming information may be used, by the policy control function, at least in part, to select a policy rule to be applied to the subscriber.

A system for enabling location-based policy in a mobile communication network is also disclosed. The system includes a Diameter agent, where the Diameter agent includes a receiving module for receiving a first Diameter signaling message. An extraction module extracts subscriber identification and roaming information from the first Diameter message and a sending module sends the extracted information to a policy control function. The roaming information may be used, by the policy control function, at least in part, to select a policy rule to be applied to the subscriber.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which.

DETAILED DESCRIPTION

The subject matter disclosed herein includes systems and methods for enabling a network operator to selectively apply a first policy to the subscriber when the subscriber is roaming in-network and to apply a second policy to that same subscriber when the subscriber is roaming out-of-network. According to the subject matter described herein, a policy rule function (e.g., PCRF) may be adapted to maintain multiple policy rules for a subscriber, where each policy rule is associated with one or more visited networks and/or intermediate networks. For example, a subscriber may have one policy rule that is associated with in-network roaming and a second policy rule that is associated with an out-of-network roaming operator. This may allow for separate policy rules to be defined for each out-of-network roaming operator that is permitted to provide roaming service to the subscriber or may allow for subscribers to have one policy rule associated with in-network roaming and a second policy rule associated with all out-of-network roaming operators.

Advantages of the subject matter described herein may include the ability to tightly control inter-carrier data roaming charges. For example, a roaming cost containment table associated with a PCRF may utilize a 'cost' parameter to decide which roaming rule set to retrieve and pass to a visited PCRF. In this manner, differential policy treatment may be applied to a subscriber based on where the subscriber is roaming.

Additional advantages may include extending bandwidth management policy into visited networks and intermediate networks or extending usage-based policy into visited networks and intermediate networks. Operators may be able to create another option for tiered pricing offers including unlimited or reduced-roaming plans/bundles. The subject matter described herein also may enable location-based policy and content decisions or least cost carrier selection. As IMS architectures are realized, this may allow network operators to share policy decisions for applications such as international shipping container tracking.

Figure 1:
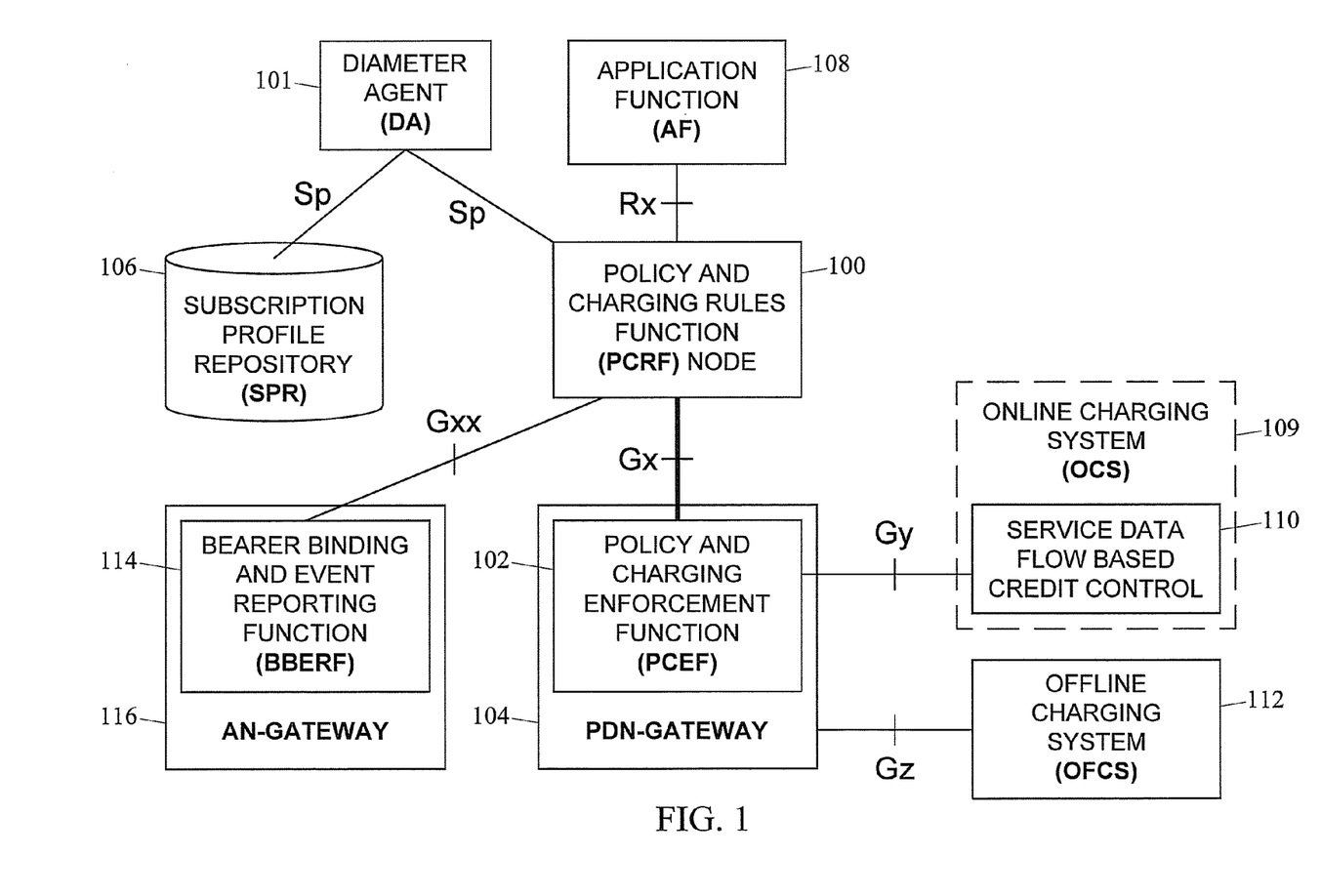
FIG. 1 is a network diagram showing an exemplary architecture suitable for providing inter-carrier roaming cost containment according to an embodiment of the subject matter described herein.

FIG. 1 is a network diagram showing an exemplary architecture suitable for providing inter-carrier roaming cost containment according to an embodiment of the subject matter described herein. Referring to FIG. 1, policy charging and rules function (PCRF) 100 includes a functional element that encompasses policy control decision and flow based charging control functionalities. PCRF 100 provides network control regarding the service data flow detection, gating, quality of service (QoS) and flow based charging towards the policy and charging enforcement function (PCEF) 102. PCRF 100 receives session and media related information from the application function and informs the application function of traffic plane events. PCRF 100 may communicate with Diameter agent 101 via the Sp interface. Diameter agent 101 may be a Diameter node that provides one of relay, proxy, redirect, routing, and/or translation services. In addition, as will be described in detail below, Diameter agent 101 may extract subscriber identification and roaming information from Diameter signaling messages and provide that information to PCRF 100 to assist in selecting policies to be applied to a roaming subscriber. PCRF 100 may provision PCC rules to PCEF 102 via the Gx reference point. PCC rule decisions may be based on one or more of the following: information obtained from an application function (AF) via the Rx interface (e.g. the session, media and subscriber related information), information obtained from PCEF 102 via the Gx interface (e.g. Internet Protocol Connectivity Access Network (IP-CAN) bearer attributes, request type and subscriber related information), information obtained from SPR 106 via the Sp reference point (e.g. subscriber and service related data), and own PCRF pre-configured information.

Policy profile information may be obtained by PCRF 100 from any suitable policy profile database, such as a subscription profile repository (SPR), a home subscriber server (HSS), an authentication, authorization, accounting (AAA) server, etc. PCRF 100 may identify appropriate policy rules by querying the subscription policy profile database and enforce the policy rules by generating and sending the policy rules to a policy and charging enforcement function (PCEF) node or/and bearer binding and event reporting function (BBERF), traffic detection function (TDF), deep packet inspection (DPI) function, or evolved packet data gateway (ePDG). Moreover, according to another embodiment, the policy profile database may be configured to push the second policy profile information to plural PCRF nodes and the plural PCRF nodes may be configured to override individual policies with the group policy.

PCEF 102 is a functional element that encompasses policy enforcement and flow-based charging functionalities. This functional entity is located at the gateway (e.g. GGSN in the GPRS case, and PDG in the WLAN case). PCEF 102 provides control over the user plane traffic handling at the gateway and its QoS, and provides service data flow detection and counting as well as online and offline charging interactions. For a service data flow that is under policy control, PCEF 102 may allow the service data flow to pass through the gateway if the corresponding gate is open. For a service data flow that is under charging control, PCEF 102 may allow the service data flow to pass through the gateway if there is a corresponding active PCC rule and, for online charging, the OCS has authorized the applicable credit with that charging key. PCEF 102 may let a service data flow pass through the gateway during the course of the credit re-authorization procedure. If requested by PCRF 100, PCEF 102 may report to PCRF 100 when the status of the related service data flow changes, which can be used to monitor an IP-CAN bearer dedicated for AF signaling traffic.

Packet data network (PDN) gateway 104 provides connectivity from user equipment (UE) (not shown) to external packet data networks (not shown) by being the point of exit and entry of traffic for the UE. A UE may have simultaneous connectivity with more than one PDN gateway for accessing multiple PDNs. PDN gateway 104 may perform policy enforcement, packet filtering for each user, charging support, lawful interception, deep packet inspection (DPI), and packet screening. PDN gateway 104 may also act as the anchor for mobility between 3GPP and non-3GPP technologies such as WiMAX and 3GPP2 (CDMA 1× and EvDO).

Subscription profile repository (SPR) 106 is a logical entity within the 3GPP PCC architecture that contains information related to subscribers and subscriptions (PCC rules). This information is used by PCRF 100 to facilitate decision making procedures and can include information on the subscriber's permitted services, service pre-emption priorities, allowed QoS allocated download and upload quotas, guaranteed bit rate, and charging related data. One example of SPR 106 may include an IMS home subscriber server (HSS). A PCC rule may consist of a: rule name, service identifier, service data flow filter(s), precedence, gate status, QoS parameters, charging key (i.e. rating group), other charging parameters, and monitoring key. The rule name may be used to reference a PCC rule in the communication between the PCEF and the PCRF. The service identifier may be used to identify the service or the service component the service data flow relates to. The service flow filter(s) may be used to select the traffic for which the rule applies. It may be possible to define wildcarded service data flow filter(s), both for the dynamic and predefined PCC rules. The gate status indicates whether the service data flow, detected by the service data flow filter(s), may pass (gate is open) or shall be discarded (gate is closed) in uplink and/or in downlink direction. The QoS information includes the QoS class identifier (authorized QoS class for the service data flow), the Allocation and Retention Priority (ARP) and authorized bitrates for uplink and downlink. The charging parameters define whether online and offline charging interfaces are used, what is to be metered in offline charging, on what level the PCEF shall report the usage related to the rule, etc. The monitoring key for a PCC rule identifies a monitoring control instance that may be used for usage monitoring control of the service data flows controlled by the predefined PCC rule or dynamic PCC rule.

Application function (AF) 108 is configured to dynamically transfer service information to PCRF 100 to allow PCRF 100 to make decisions based on policy. In addition, AF 108 may also receive IP-CAN specific information and notification regarding IP-CAN bearer level events. A particular example of AF 108 may include a proxy-call session control function (P-CSCF).

Online charging system (OCS) 109 determines in real-time or near real-time whether the subscriber is authorized to perform a given action based on their prepaid credit status. Depending on whether, for example, immediate event charging (IEC) or event charging with unit reservation (ECUR) is used, OCS 109 may immediately authorize or disallow the completion of a chargeable event or may reserve a number of prepaid credits and either reauthorize additional credits or terminate a subscriber's session once the reserved credits have been used. This determination may be made in conjunction with prepaid application which contains prepaid credit status information associated with subscribers. For example, OCS 109 may query a prepaid application to determine whether a subscriber possesses enough credit to complete a desired transaction, such as a placing VoIP call or delivering a text message. Additionally, OCS 109 may copy accounting messages associated with a charging event and provide the copied messages to a downstream application for additional processing.

Service data flow based credit control 110 may perform online credit control functions together with OCS 109.

Offline Charging system (OFCS) 112 may generate charging events based on the observation of network resource usage. In networks and service elements that provide charging information, OFCS 112 may be the focal point for collecting and processing the information pertaining to chargeable events.

Bearer binding and event reporting function (BBERF) 114 may include a functional element within AN-gateway 116. BBERF 114 may provide control over user plane traffic handling and encompasses the following functionalities: bearer binding, uplink bearer binding verification, and event reporting. For a service data flow that is under QoS control, BBERF 114 may ensure that the service data flow is carried over the bearer with the appropriate QoS class. BBERF 114 may report events to PCRF 100 based on the event triggers installed by the PCRF 100.

Access network (AN) gateway 116 refers to the serving gateway (S-GW) when Gxc applies and to a trusted non-3GPP access gateway when Gxa applies.

Figure 2:
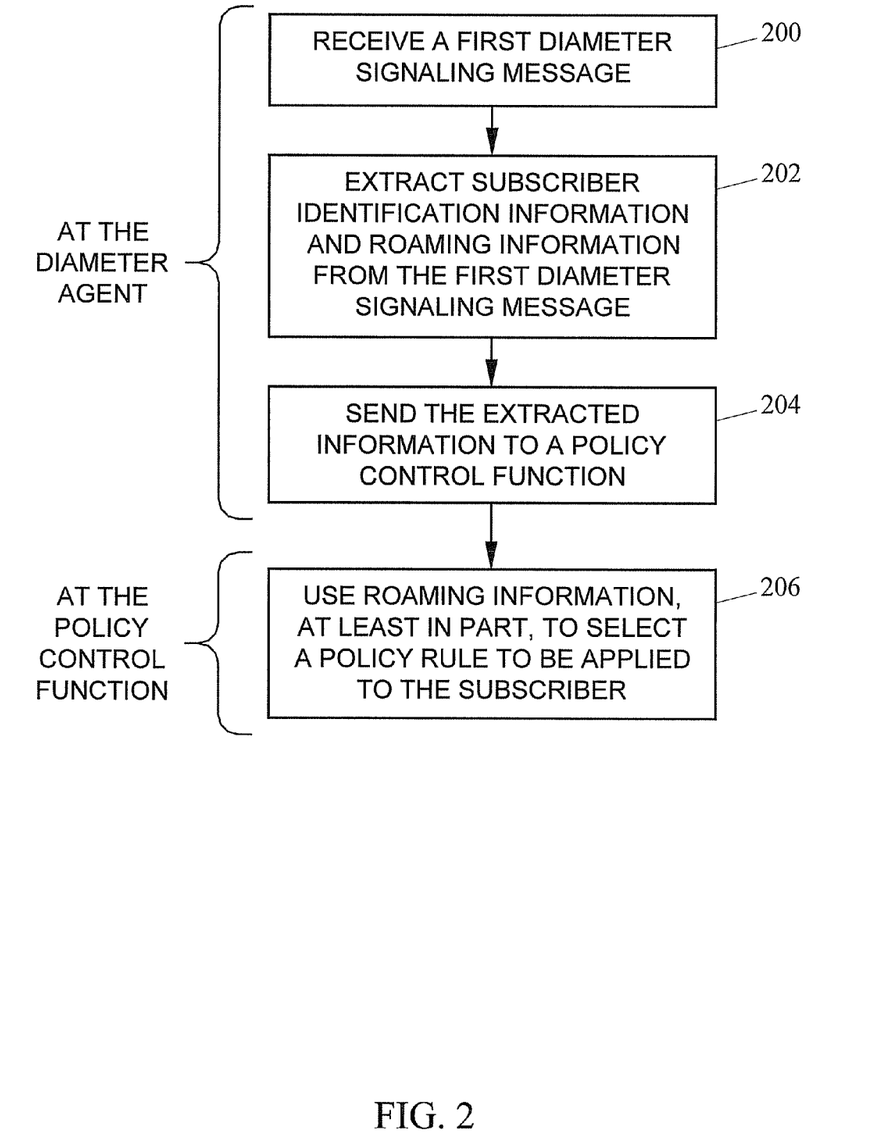
FIG. 2 is a flow chart illustrating exemplary steps for providing inter-carrier roaming cost containment according to an embodiment of the subject matter described herein.

FIG. 2 is a flow chart illustrating exemplary steps for providing inter-carrier roaming cost containment according to an embodiment of the subject matter described herein. Referring to FIG. 2, at step 200, a first Diameter signaling message is received by a Diameter agent. For example, this may include receiving an Update Location Request (ULR) message at one of a Diameter routing agent, Diameter relay agent, and Diameter proxy agent, such as Diameter agent 101 illustrated in FIG. 1.

At step 202, subscriber identification information and roaming information are extracted from the first Diameter message. For example, Diameter agent 101 may extract a mobile country code (MCC) and/or a mobile network code (MNC) from the ULR message. This may also include extracting the subscriber identification and visited and/or intermediate network identification information from a decorated network access identifier (NAI) value in a User-Name attribute value pair (AVP) of a DIAMETER message. NAI decoration may be used to force routing of Diameter messages through a predefined list of realms to reach the home realm in order to enforce inter-carrier roaming agreements. This list of realms or intermediate networks may be extracted from the Decorated NAI value and provided to the PCRF to facilitate policy selection. In one example, the visited network may not have direct connectivity to the home network. In such an example, the roaming terminal may decorate the NAI parameter to specify the intermediate network or networks between the visited network and the home network through which message traffic must travel. The visited network identification information and the identification of any intermediate network may be extracted from the decorated NAI parameter and used in selecting policies to apply to the subscriber. As used herein, the term "roaming information" is intended to refer to visited network identification and/or any intermediate network identification information.

In one possible embodiment, the extracted information may be stored at the DIAMETER routing agent. The DIAMETER routing agent may then receive an SPR response message from a subscription profile repository associated with the subscriber and insert at least a portion of the extracted information into the SPR response message in order to create a modified SPR response message. The modified SPR response message may be sent to a policy control function.

At step 204, the extracted information is sent to a policy control function. For example, Diameter agent 101 may communicate the extracted MCC/MNC to PCRF 100 using one of lightweight directory access protocol (LDAP), simple object access protocol (SOAP), extensible markup language (XML), Diameter, and remote authentication dial in user service (RADIUS) protocols. In one embodiment, the roaming information is used, by the policy control function, at least in part, to select a policy rule to be applied to the subscriber.

Figure 3:
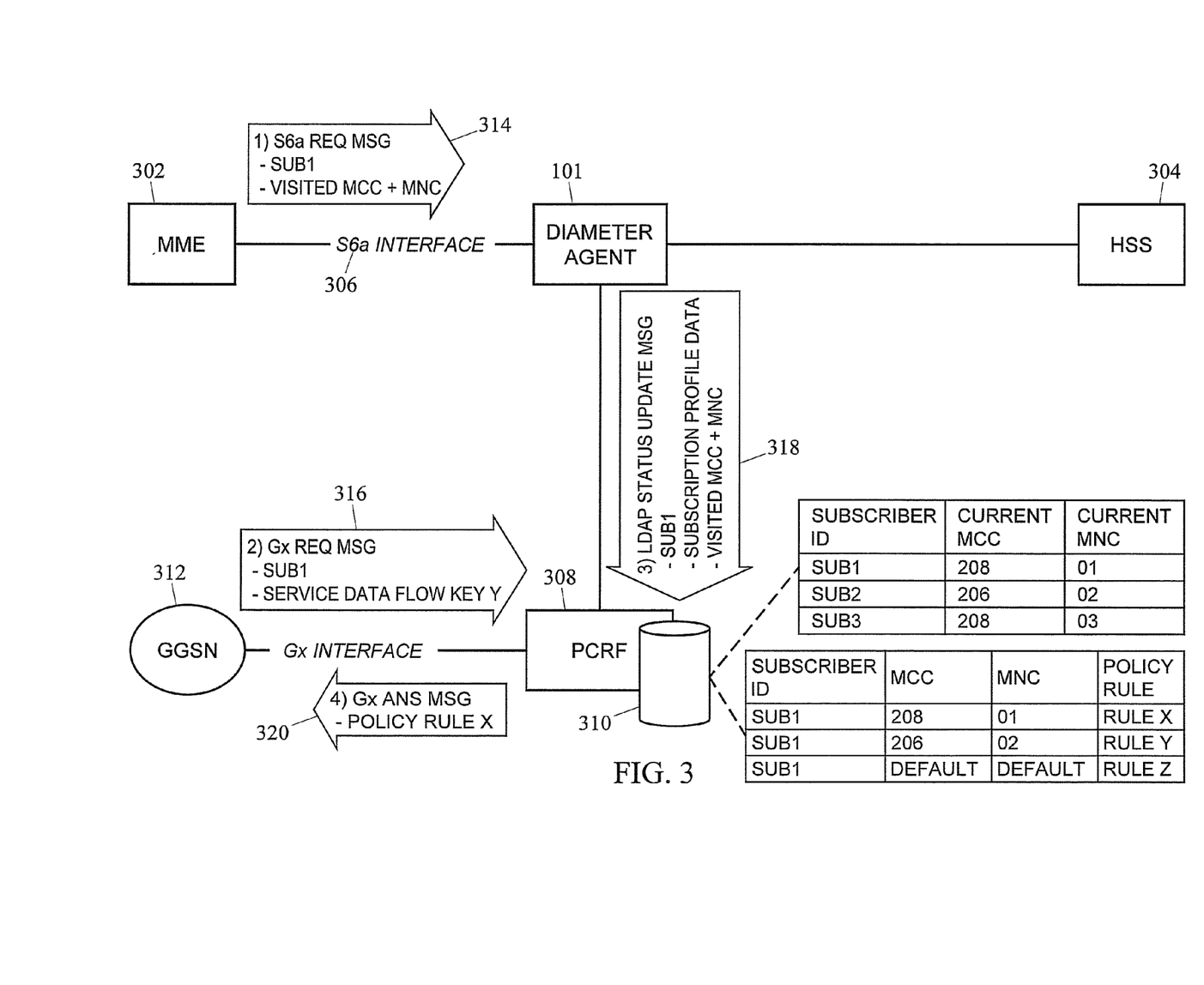
FIG. 3 is a network and message flow diagram showing an exemplary architecture suitable for providing inter-carrier roaming cost containment where a Diameter agent obtains roaming information from a Diameter signaling message and provides the information to a PCRF according to an embodiment of the subject matter described herein.

FIG. 3 is a network and message flow diagram showing an exemplary architecture suitable for providing inter-carrier roaming cost containment where Diameter agent 101 obtains roaming information from a Diameter signaling message and provides the information to a PCRF according to an embodiment of the subject matter described herein.

Referring to FIG. 3, Diameter agent 101 may be configured to monitor Diameter signaling message traffic sent between MME 302 and HSS 304 on S6*a* interface 306 and extract information from some of the DIAMETER signaling messages. For example, Diameter agent 101 may extract information from a ULR Diameter signaling message which identifies (1) a subscriber and (2) the mobile country code (MCC)+mobile network code (MNC) associated with the current serving PLMN. The extracted information may be communicated to PCRF 308 (or other policy rules/decision engine) and PCRF 308 may store the extracted subscriber identifier and current MCC/MNC information in a data structure such as roaming cost containment table (RCCT) 310. PCRF 308 may also be configured to use the current MCC/MNC information when selecting a policy rule(s) for the subscriber.

In the exemplary messaging scenario shown, Diameter agent 101 may intercept S6a request message 314 that includes subscriber identifier "Sub1" and roaming information MCC and MNC over S6a interface 306. PCRF 308 may receive Gx request message 316 from GGSN 312 that includes subscriber identifier "Sub1" and service data flow key Y over a Gx interface. Diameter agent 101 may then extract the Sub1 and MCC/MNC from message 314 and send LDAP status update message 318 that includes the extracted subscriber identifier Sub1 and the MCC/MNC, along with subscription profile data, to PCRF 308. PCRF 308 may then use this information to determine a policy rule (e.g., policy rule X) for the subscriber and send Gx answer message 320 including policy rule X to GGSN 312.

According to one possible aspect, roaming cost containment table 310 associated with PCRF 308 may set a 'cost' flag to determine inter-carrier roaming charges (roaming agreement pricing terms). When set to 'high cost', PCRF 308 may retrieve a roaming rule set to pass to a visited PCRF (not shown) via an S9 interface. In this manner, differential policy treatment may be applied to a subscriber based on where the subscriber is roaming (i.e., based on the visited PLMN).

Figure 4:
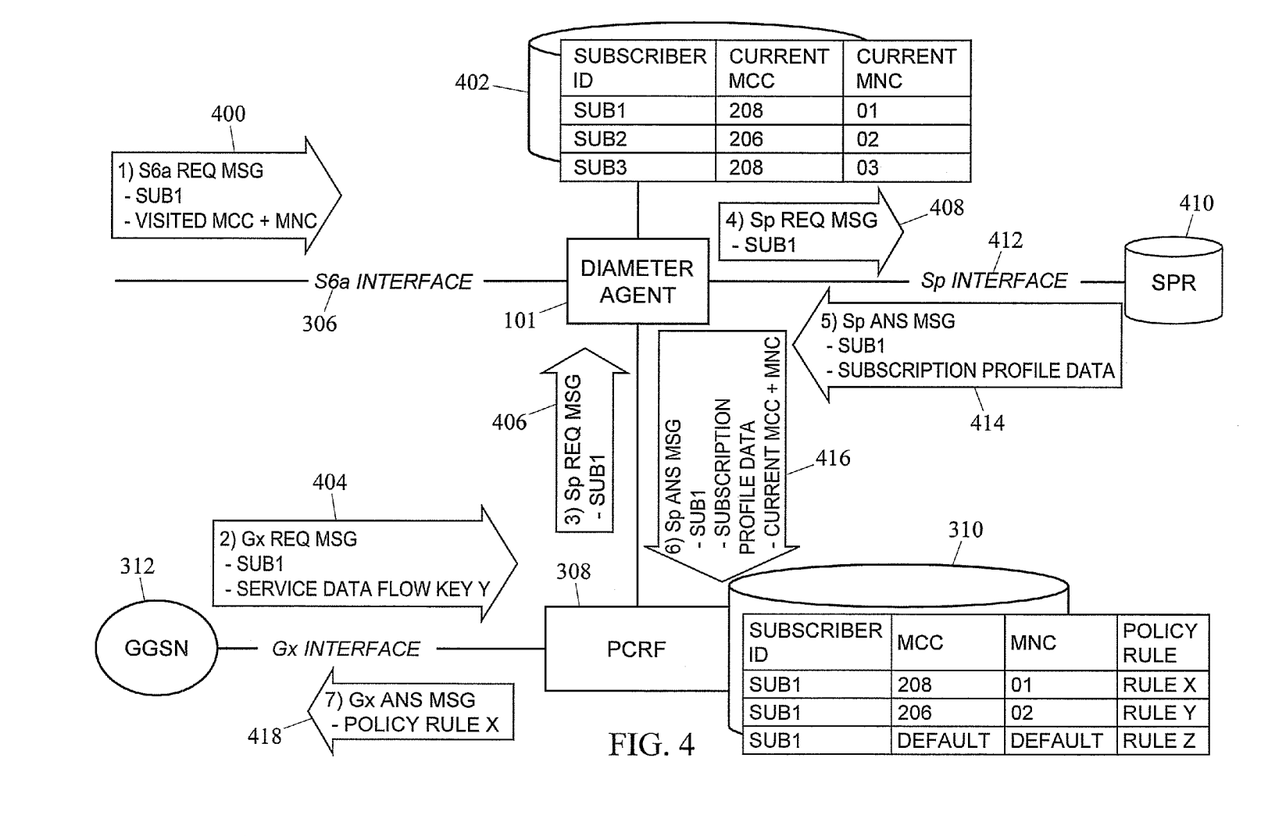
FIG. 4 is a network and message flow diagram showing an exemplary architecture suitable for providing inter-carrier roaming cost containment where a Diameter agent obtains roaming information, caches the information, and uses the cached information to modify an SPR response destined for the PCRF according to an alternate embodiment of the subject matter described herein.

FIG. 4 is a network and message flow diagram showing an exemplary architecture suitable for providing inter-carrier roaming cost containment where Diameter agent 101 obtains roaming information, caches the information, and uses the cached information to modify an SPR response destined for the PCRF according to an alternate embodiment of the subject matter described herein. Referring to FIG. 4, Diameter agent 101 may be adapted to monitor Diameter signaling message traffic sent between MME 302 and HSS 304 on S6a interface 306 and to extract information from some of the Diameter signaling messages For example, Diameter agent 101 may extract information from Update Location Request 400 which identifies (1) a subscriber and (2) the mobile country code (MCC)+mobile network code (MNC) associated with the current serving PLMN. The extracted information may be stored/cached by Diameter agent 101 using associated data structure 402.

PCRF 308 (or other policy rules/decision engine) may then query subscription profile repository (SPR) 410 to obtain subscription information for a subscriber via Sp interface 412. In one embodiment, Diameter agent 101 monitors Sp interface 412 message traffic and intercepts response message 414 sent from SPR 410 to PCRF 308. Diameter agent 101 then inserts current MCC+MNC information for the associated subscriber in SPR response message 416. The modified message 416 is transmitted to PCRF 308. PCRF 308 may then be configured to use the current MCC/MNC information when selecting a policy rule(s) for the subscriber.

Thus, in the exemplary messaging scenario shown, Diameter agent 101 may receive S6a request message 400 that includes subscriber identifier "Sub1" and visited and/or intermediate network identification information MCC and MNC over S6a interface 306. PCRF 308 may receive Gx request message 404 from GGSN 312 that includes subscriber identifier "Sub1" and service data flow key Y over a Gx interface. PCRF 308 may then formulate and send Sp Request message 406 including Sub1 to Diameter agent 101. Diameter agent 101 may forward Sp Request message 406 as Sp Request message 408 to SPR 410 in order to obtain subscription profile data in an Sp Answer message, such as Sp Answer message 414. Based on the current MCC+MNC information stored in cache/database 402, Diameter agent 101 may insert the current MCC+MNC information for subscriber Sub1 into SPR response message 416 and send the modified message 416 to PCRF 308. PCRF 308 may then consult cache/database 310 in order to determine a policy rule corresponding to Sub1 for the current MCC+MNC. The policy rule, in this case policy rule X, may be included in Gx Answer message 418 and sent to GGSN 312.

According to another aspect, Diameter agent 101 may be configured to operate as a proxy for SPR 410. In this case PCRF 308 may send SPR query 406 to Diameter-proxy (not shown). The Diameter-proxy may query SPR 410 and receive a response to the query from SPR 400. Diameter agent 101 may then generate a response message that includes the current MCC+MNC information for the associated subscriber, and send this proxied SPR response message to PCRF 308. PCRF 308 may then be configured to use the current MCC/MNC information when selecting a policy rule(s) for the subscriber.

As described above with respect to FIG. 3, RCCT 310 associated with PCRF 308 may be configured to set a 'cost' flag to determine inter-carrier roaming charges (roaming agreement pricing terms). When set to 'high cost', PCRF 308 may retrieve a roaming rule set to pass to a visited PCRF (not shown) via an S9 interface. In this manner, differential policy treatment may be applied to a subscriber based on where the subscriber is roaming (i.e., based on the visited PLMN).

Figure 5:
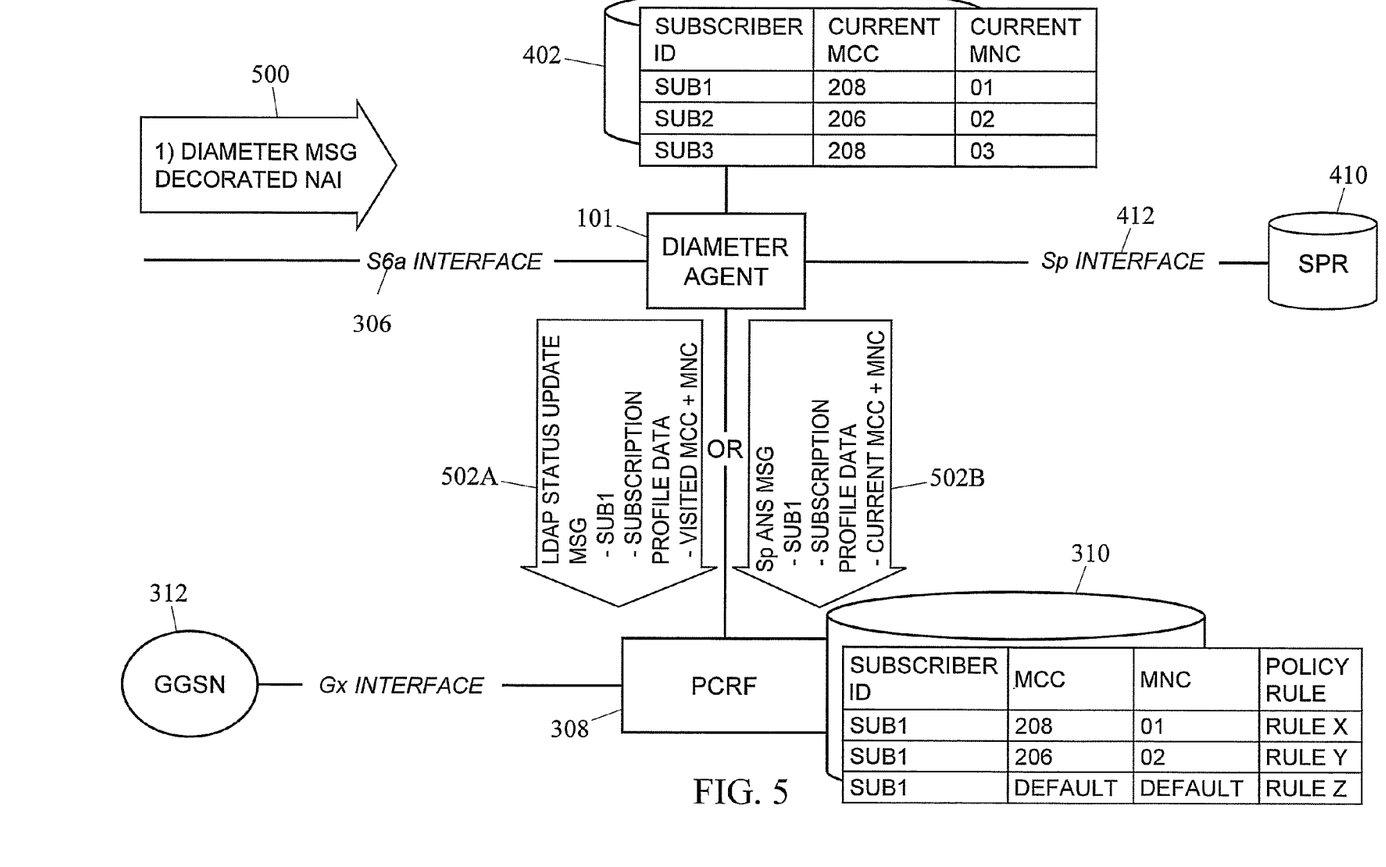
FIG. 5 is a network and message flow diagram showing an exemplary architecture suitable for providing inter-carrier roaming cost containment where a Diameter agent obtains roaming information from a decorated NAI parameter of a Diameter signaling message originating from a long term evolution (LTE), evolved packet system (EPS), or IP multimedia subsystem (IMS) network element according to yet another embodiment of the subject matter described herein.

FIG. 5 is a network and message flow diagram showing an exemplary architecture suitable for providing inter-carrier roaming cost containment where Diameter agent 101 obtains roaming information from a decorated NAI parameter of a Diameter signaling message originating from a long term evolution (LTE), evolved packet system (EPS), or IP multimedia subsystem (IMS) network element according to yet another embodiment of the subject matter described herein. Referring to FIG. 5, Diameter agent 101 may be adapted to monitor Diameter signaling message traffic sent in LTE/EPS/IMS network. In this embodiment, Diameter agent 101 may be adapted to extract MCC+MNC information, as discussed above; from a decorated Network Access Identifier (NAI) contained in an observed, received, or intercepted Diameter message associated with a subscriber. For example, decorated NAI may be stored in the User-Name AVP of a Diameter message 500. Once the MCC+MNC information is obtained, it may be used as described above.

Thus, in the exemplary messaging scenario shown, Diameter agent 101 may receive Diameter message 500 that includes a decorated NAI over S6a interface 306. Diameter agent 101 may then extract MCC+MNC information from the User-Name AVP of Diameter message 500. In one possible scenario, Diameter agent 101 may insert the MCC+MNC information for subscriber Sub1 along with subscription profile data into LDAP Status Update message 502A. In a second possible scenario, Diameter agent 101 may insert the MCC+MNC information for subscriber Sub1 along with subscription profile data into Sp Answer message 502B. It is appreciated that other message types may also be used without departing from the scope of the subject matter described herein. Regardless of the message format (e.g., messages 502A or 502B) may be sent to PCRF 308.

Figure 6:
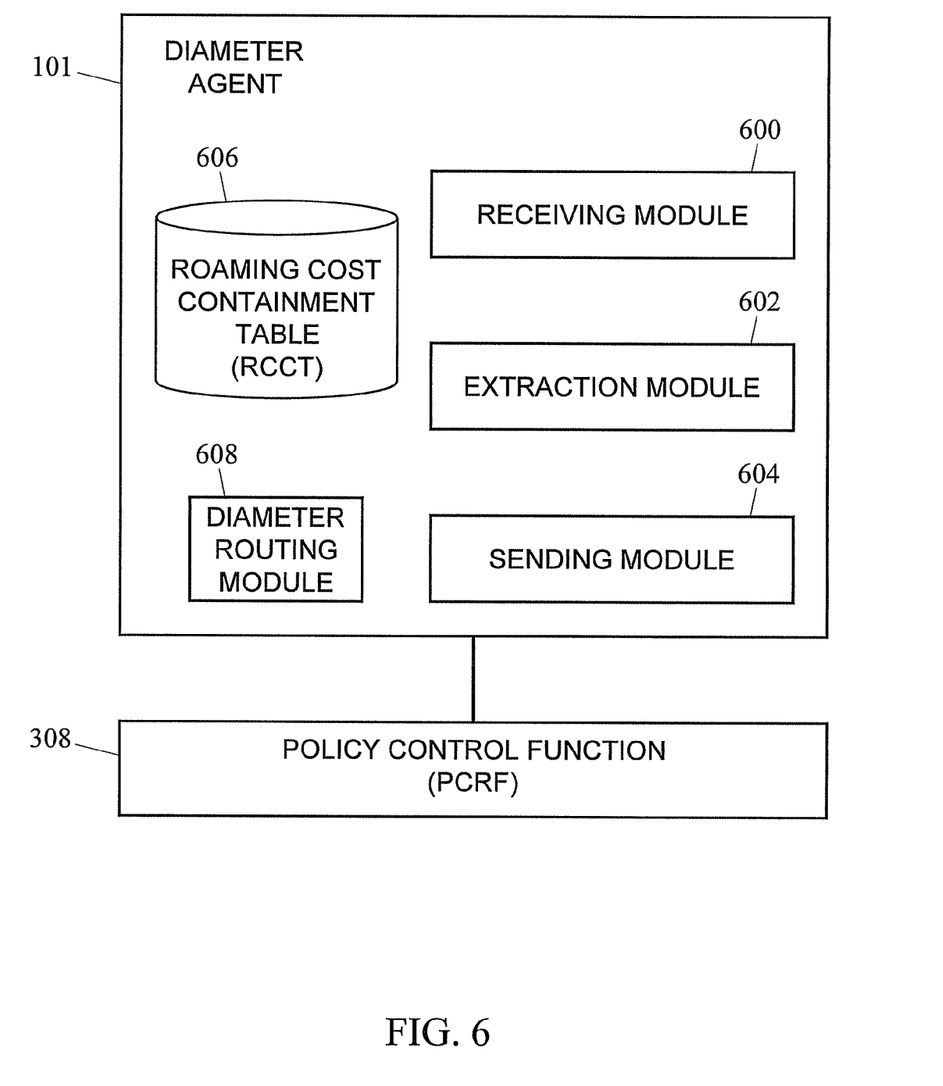
FIG. 6 is a block diagram illustrating an exemplary Diameter agent architecture suitable for providing inter-carrier roaming cost containment according to an embodiment of the subject matter described herein.

FIG. 6 is a block diagram illustrating an exemplary Diameter agent architecture suitable for providing inter-carrier roaming cost containment according to an embodiment of the subject matter described herein. Referring to FIG. 6, Diameter agent 101 may include receiving module 600 for receiving a first Diameter signaling message at a Diameter agent. The receiving module may be configured to receive Diameter signaling messages such as Update Location Request message. Diameter agent 101 may include one of a Diameter signaling router, a Diameter relay agent, and a Diameter proxy agent. For example, if Diameter agent 101 is a Diameter signaling router or Diameter routing agent, Diameter agent 101 may include a Diameter routing module 608 for routing Diameter signaling messages based on Diameter level information.

Extraction module 602 may be configured to extract subscriber identification and roaming information from the first Diameter message. Extraction module 602 is configured to extract a mobile country code (MCC) and/or a mobile network code (MNC) associated with visited and/or intermediate networks. Extraction module 602 is configured to extract the subscriber identification information and the roaming information from a decorated network access identifier (NAI) value in a User-Name attribute value pair (AVP) of a Diameter message.

Sending module 604 may be configured to communicate the extracted information to policy control function 308. Sending module 604 may be configured to send the extracted information using one of lightweight directory access protocol (LDAP), simple object access protocol (SOAP), extensible markup language (XML), Diameter, and remote authentication dial in user service (RADIUS). In one embodiment, policy control function 308 may be a policy charging and rules function (PCRF).

In some embodiments, Diameter agent 101 may include roaming cost containment table 606 for storing the extracted subscriber identifier and visited network information. Roaming cost containment table 606 may store the extracted information at the Diameter agent and the DIAMETER routing agent may be configured to receive an SPR response message from a SPR associated with the subscriber, insert at least a portion of the extracted information into the SPR response message in order to create a modified SPR response message, and send the modified SPR response message to policy control function 308. The policy control function may be configured to use the roaming information, at least in part, to select a policy rule to be applied to the subscriber.

It should be noted that each of the modules 600, 602, 604, 606, and 608 may include a hardware component, such as a processor and memory for implementing the described functions.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for enabling location-based policy in a mobile communication network, the method comprising:
at a Diameter signaling router:
routing Diameter signaling messages based on Diameter level information;
monitoring Diameter signaling message traffic exchanged between a mobility management entity (MME) and a home subscriber server (HSS) on an S6a interface;
intercepting a first DIAMETER signaling message transmitted between the MME and the HSS on the S6a interface;
extracting subscriber identification and roaming information from the first Diameter message; and
sending the extracted information to a policy control function.

2. The method of claim 1 comprising using, at the policy control function, the roaming information, at least in part, to select a policy rule to be applied to the subscriber.

3. The method of claim 1 wherein intercepting the first Diameter signaling message includes intercepting an Update Location Request message.

4. The method of claim 1 wherein extracting the roaming information includes extracting a mobile country code (MCC) identifying a country of a visited network or an intermediate network.

5. The method of claim 1 wherein extracting the roaming information includes extracting a mobile network code (MNC) identifying a visited network or an intermediate network.

6. The method of claim 1 wherein sending the extracted information includes sending the extracted information using one of lightweight directory access protocol (LDAP), simple object access protocol (SOAP), extensible markup language (XML), Diameter, and remote authentication dial in user service (RADIUS).

7. The method of claim 1 wherein the policy control function includes a policy and charging rules function (PCRF).

8. The method of claim 1 wherein sending the extracted information to the policy control function includes sending, from the Diameter signaling router, the modified SPR response message to the policy control function.

9. The method of claim 1 wherein extracting the roaming information includes visited network identification information and identification information for at least one intermediate network between the visited network and a home network of a subscriber from a decorated network access identifier (NAI) value in a Diameter signaling message originating from a long term evolution (LTE), evolved packet system (EPS), or IP multimedia subsystem (IMS) network element.

10. A system for enabling location-based policy in a mobile communication network, the system comprising:
a Diameter signaling router comprising:
a routing module for routing Diameter signaling messages based on Diameter level information;
a receiving module for monitoring Diameter signaling message traffic exchanged between a mobility management entity (MME) and a home subscriber server (HSS) on an S6a interface and for intercepting a first Diameter signaling message transmitted between the MME and the HSS on the S6a interface;
an extraction module for extracting subscriber identification and roaming information from the first Diameter message; and
a sending module for communicating the extracted information to a policy control function.

11. The system of claim 10 wherein the policy control function is configured to use the roaming information, at least in part, to select a policy rule to be applied to the subscriber.

12. The system of claim 10 wherein the first Diameter signaling message comprises an Update Location Request message.

13. The system of claim 10 wherein the extraction module is configured to extract a mobile country code (MCC) identifying a country of a visited or intermediate network.

14. The system of claim 10 wherein the extraction module is configured to extract a mobile network code (MNC) identifying a visited or intermediate network.

15. The system of claim 10 wherein the sending module is configured to send the extracted information using one of lightweight directory access protocol (LDAP), simple object access protocol (SOAP), extensible markup language (XML), Diameter, and remote authentication dial in user service (RADIUS).

16. The system of claim 10 wherein the policy control function includes a policy and charging rules function (PCRF).

17. The system of claim 10 comprising a roaming cost containment table (RCCT) for storing the extracted information at the Diameter signaling router and wherein the Diameter routing agent is further configured to:
receive an SPR response message from a subscription profile repository (SPR) associated with the subscriber; and
insert at least a portion of the extracted information into the SPR response message in order to create a modified SPR response message, wherein the sending module is configured to send the modified SPR response message to the policy control function.

18. The system of claim 10 wherein the roaming information includes information identifying a visited network and at least one intermediate network between the visited network and a home network of the subscriber and wherein the extraction module is configured to extract the roaming information from a decorated network access identifier (NAI) value in a Diameter signaling message originating from a long term evolution (LTE), evolved packet system (EPS), or IP multimedia subsystem (IMS) network element.

19. A non-transitory computer readable medium having stored computer executable instructions that when executed by a processor of a computer cause the computer to perform steps comprising:
at a Diameter signaling router:
routing Diameter signaling messages based on Diameter level information;
monitoring Diameter signaling message traffic exchanged between a mobility management entity (MME) and a home subscriber server (HSS) on an S6a interface;
intercepting a first DIAMETER signaling message transmitted between the MME and the HSS on the S6a interface;
extracting subscriber identification and roaming information from the first Diameter message; and
communicating the extracted information to a policy control function.

\* \* \* \* \*